United States Patent [19]

MacGregor, Jr.

[11] 3,941,237
[45] Mar. 2, 1976

[54] PUCK FOR AND METHOD OF MAGNETIC CONVEYING

[75] Inventor: Fred M. MacGregor, Jr., West Keansburg, N.J.

[73] Assignee: Carter-Wallace, Inc., New York, N.Y.

[22] Filed: Dec. 28, 1973

[21] Appl. No.: 429,648

[52] U.S. Cl. ............. 198/41; 198/131; 215/DIG. 1; 220/85 H
[51] Int. Cl.² ........................................ B65G 17/46
[58] Field of Search ...... 198/41, 131, 179, DIG. 13; 15/304; 215/100.5, DIG. 1; 220/85 H; 206/818

[56] References Cited
UNITED STATES PATENTS

| | | | |
|---|---|---|---|
| 2,385,050 | 9/1945 | Becker | 198/131 X |
| 2,646,773 | 7/1953 | Burton | 198/179 |
| 2,968,888 | 1/1961 | Borah | 215/100.5 |
| 2,980,938 | 4/1961 | Whelan | 15/304 |
| 3,085,705 | 4/1963 | Varney | 215/DIG. 1 |
| 3,090,478 | 5/1963 | Stanley | 198/131 |
| 3,285,456 | 11/1966 | Pewitt | 215/100.5 |
| 3,447,663 | 6/1969 | Sarovich | 198/41 |
| 3,565,234 | 2/1971 | Birdsong | 198/41 X |
| 3,578,144 | 5/1971 | Punzak | 198/41 |
| 3,633,863 | 1/1972 | Abbey | 215/100.5 |
| 3,738,529 | 6/1973 | Rose | 220/85 H |

*Primary Examiner*—Evon C. Blunk
*Assistant Examiner*—Richard K. Thomson
*Attorney, Agent, or Firm*—Marn & Jangarathis

[57] ABSTRACT

A plastic puck having a magnetic ring secured to its bottom is employed for magnetically conveying a can. The interior of the puck preferably includes deflectable plastic fins for securely holding the can within the puck.

2 Claims, 6 Drawing Figures

PUCK FOR AND METHOD OF MAGNETIC CONVEYING

This invention relates to conveying of articles, and more particularly to a puck for and a method of conveying non-magnetic articles.

Non-magnetic materials are generally conveyed by standard belt conveyors. A standard belt conveyor, however, is limited in that such a conveyor is not capable of conveying materials in a non-horizontal direction.

An object of this invention is to provide for improved conveying of non-magnetic articles.

Another object of the present invention is to provide for magnetic conveying of non-magnetic articles in a direction other than a horizontal direction.

A further object of the present invention is to provide for magnetic conveying of non-magnetic cans including improved means for cleaning the cans.

Still another object of the present invention is to provide a puck for conveying non-magnetic articles.

Yet a further object of the present invention is to provide for coding of containers while being magnetically conveyed.

These and other objects of the invention should be apparent from reading the following description thereof.

In accordance with the present invention, a non-magnetic article is conveyed on a magnetic conveyor within a puck which holds and grips the non-magnetic article. The puck includes a magnetic material which magnetically holds the puck to the magnetic conveyor whereby the article within the puck is magnetically conveyed on the belt.

The puck is in the form of a container having an interior for receiving the article to be conveyed. The interior of the container includes means for holding the article within the container in a manner such that the article is held within the container, even when conveyed in an inverted position, but the article is not held so firmly that there is difficulty in removing the article from the puck. The bottom of the container has secured thereto a magnetic material whereby the container can be magnetically held by a magnetic conveyor.

The present invention is particularly applicable to the conveying of containers which are to be filled with a material. In accordance with one aspect of the present invention, the container to be filled is magnetically conveyed within the puck in an inverted position during a portion of the conveying cycle, and is cleaned in the inverted position by means of an air jet into the open container top.

The invention will be further described with respect to the accompanying drawings wherein.

Figure 1:
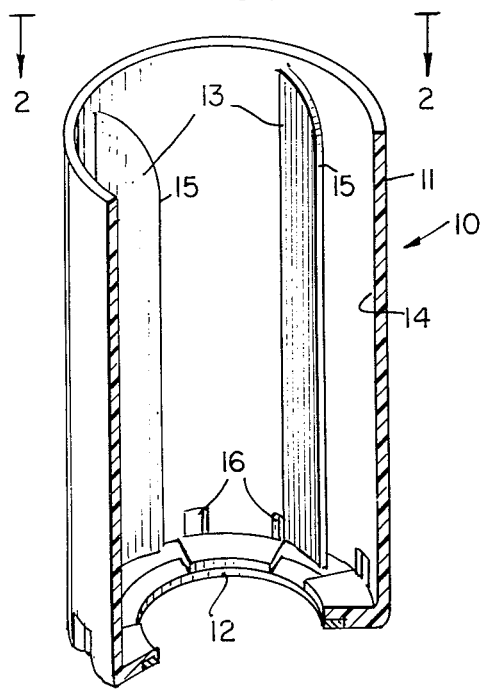
FIG. 1 is an isometric view, partially broken away, of an embodiment of the puck of the present invention.
Figure 3:
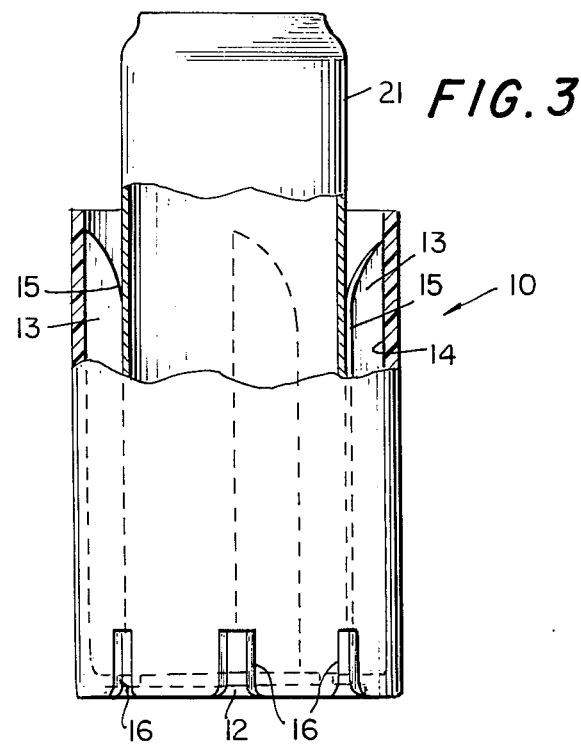
FIG. 3 is an elevational view of the embodiment of FIG. 1.
Figure 2:
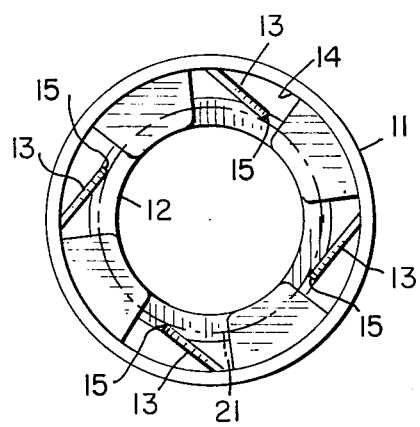
FIG. 2 is a top view of the embodiment of FIG. 1.

Referring now to FIGS. 1–3 of the drawings, there is illustrated a puck, generally indicated as 10, for magnetically conveying a non-magnetic article. As particularly shown, the puck is in the form of a cylindrical plastic container 11 which includes at the bottom thereof a ring 12 of a magnetic material such as a grade of stainless steel or chrome plated carbon steel.

The interior of the container 11 includes means for holding an article, such as a can 21, to be conveyed in the form of a plurality of elongated deflectable plastic fins 13 which are connected to and extend angularly inwardly from the interior wall 14 of the container 11. The free ends 15 of the fins 13 are spaced from the interior wall 14 and the fins 13 are deflected inwardly toward the wall upon inserting an article 21 to be conveyed into the container. The container 11 and fins 13 are most preferably formed of polypropylene in that polypropylene has the ability to return to its original shape after being deformed, even when heated in a hot water bath. In this manner, the container 11 can be used to convey articles of different sizes in that the fins 13 can return to their original position after removal of an article.

The fins 13 function to tightly hold an article to be conveyed even in an inverted position, but as should be apparent, as a result of the deflectability of the fins 13 the article can be inserted and removed from the container without difficulty, either by hand or by machine.

The puck 10 can be easily produced by any one of a wide variety of molding procedures and the magnetic material may be secured and embedded into the bottom of the container by placing the ring 12 of magnetic material into the mold, prior to forming of the container, followed by forming the container around the ring 12.

It is to be understood, that although the puck has been particularly shown with an open bottom, the puck could be formed with a closed bottom. The use of an open bottom is preferred in that a container within the puck can be coded through the open bottom of the puck during the conveying cycle. In addition, the open bottom provides for drainage from the puck; e.g., drainage of water.

Figure 4:
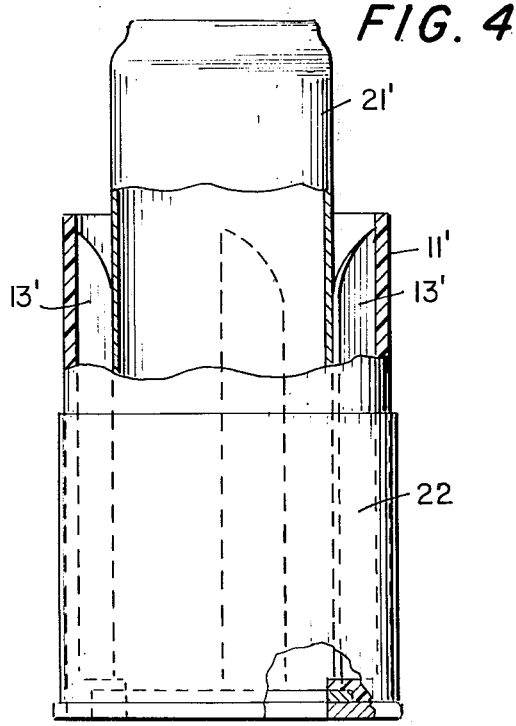
FIG. 4 is an elevational view of another embodiment of the puck of the present invention.

Similarly, the magnetic material can be secured to the container in a manner other than by forming the container around a ring of magnetic material as particularly described. Thus, for example, a puck can be formed of a container 11' inserted into and secured to a sleeve 22 of magnetic material, as shown for example in FIG. 4. The use of the modified puck of FIG. 4 also produces the advantage that the magnetic force between the puck and a magnetic conveyor is distributed over a greater puck area permitting a change in conveying characteristics.

Similarly, as particularly shown, the container 11 is provided with a plurality of circumferentially spaced apertures 16, which are provided to allow draining of material, particularly water, from the interior of the container 11 in that the illustrated puck, has been particularly designed for conveying of aersol cans which are submerged into a hot water bath for the purpose of leak testing. As should be apparent to those skilled in the art such apertures could be omitted.

The conveying of a non-magnetic article, in particular, a can; e.g., a can formed of aluminum, in accordance with the present invention will be described with reference to FIG. 5.

Figure 5:
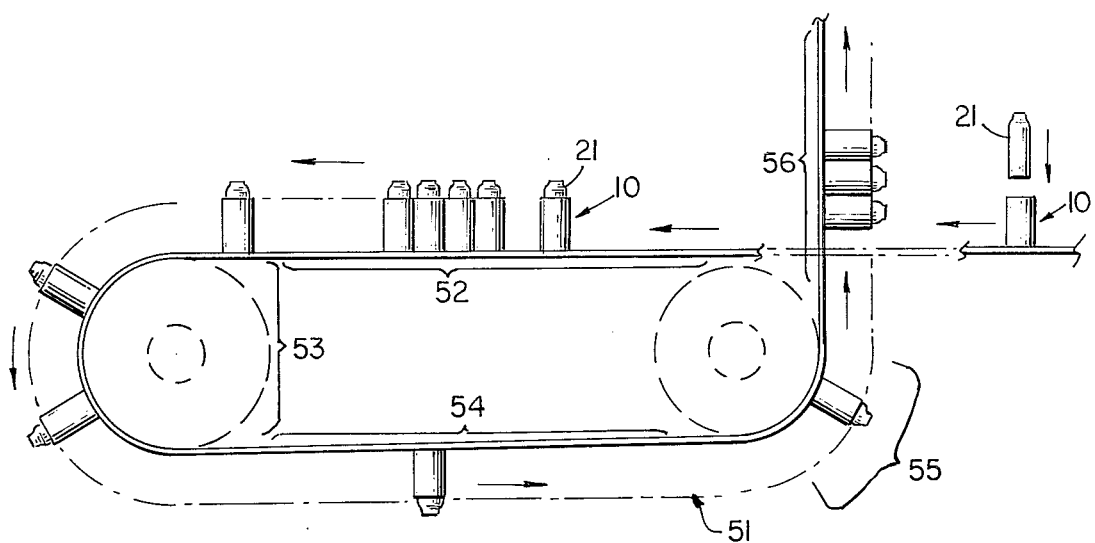
FIG. 5 is a simplified schematic representation of a portion of a magnetic conveying assembly incorporating the present invention.

Referring to FIG. 5, there is shown a portion of a magnetic conveyor, generally indicated as 51, of a type known in the art; e.g., magnetic conveyors are commercially available from Eriez Magnetics Corporation, and are comprised of belts moving over enclosed magnetic rails.

As particularly shown, the illustrated portion of the magnetic conveyor 51 is comprised of a horizontal portion 52 in which cans 21 in pucks 10 are magnetically conveyed in an upright vertical position; a portion 53 in which the cans 21 in pucks 10 are magnetically conveyed around 180° turn to an inverted vertical position; a horizontal portion 54 in which the cans 21 in pucks 10 are magnetically conveyed in an inverted vertical position; a portion 55 in which the cans 21 in pucks 10 are magnetically conveyed around a 90° bend to a horizontal position; and a vertical portion 56 in which the cans 21 in pucks 10 are magnetically conveyed in a horizontal position. As known in the art, the magnetic conveying to change from a horizontal to a vertical direction is effected, as shown, in order to move the belt carrying the cans over an outside radius in changing from horizontal to vertical conveying in that the belt can not be maintained to an inside radius in conveying cans. As hereinabove described, the cans 21 which are formed of a non-magnetic material are securely held within the pucks 10 by the fins 13 and the pucks 10 are secured and magnetically held to the magnetic belt through the ring 12 of magnetic material. The pucks 10 are capable of holding the cans when filled or empty.

As should be apparent from the hereinabove description, the use of pucks in accordance with the present invention permits magnetic conveying of a non-magnetic article, such as an aluminum can, in all directions. The cans can be manually or automatically loaded into the pucks, and after completion of the conveying cycle, which may include cleaning of the cans, bottom coding and filling, the cans can be easily removed from the pucks either manually or by other means.

Figure 6:
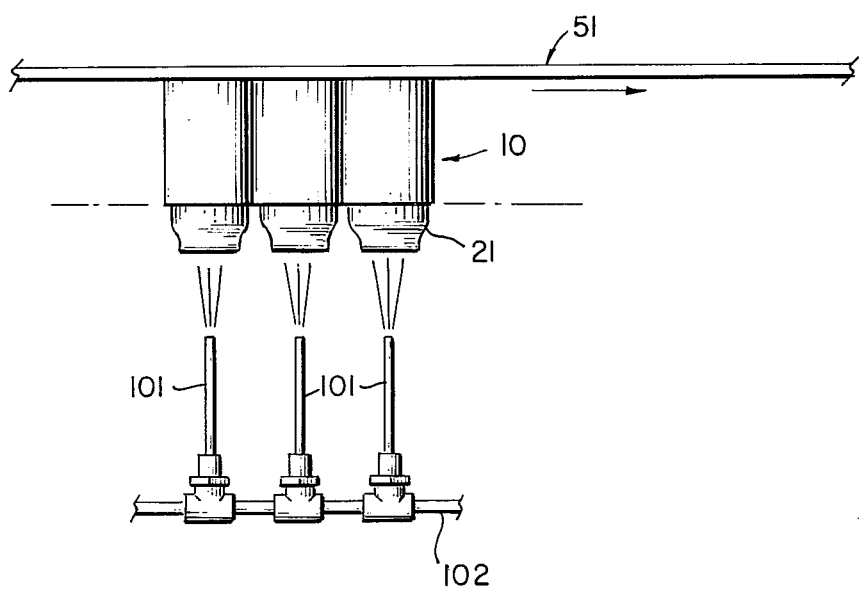
FIG. 6 is a simplified schematic representation of a portion of a magnetic conveying assembly incorporating the can cleaning station of the present invention.

In accordance with one aspect of the present invention, there is provided means for cleaning a can, prior to filling thereof. As particularly shown in FIG. 6, a can 21 may be cleaned while held in puck 10 and being magnetically conveyed in an inverted position by providing air jets 101 which are connected to a source of compressed air (not shown) through a suitable supply line 102. The jets 101 direct the compressed air into the interior of the inverted cans 21 and provide for air cleaning of the can interior.

Numerous modifications of the hereinabove described embodiments are possible within the spirit and scope of the present invention. As should be apparent from the above description, the puck can be designed in different shapes and forms to meet the needs of a particular system. Similarly, the magnetic material may be secured to the puck or provided in a form other than as particularly described. Similarly, although the invention has been particularly described with respect to the preferred embodiment wherein deflectable fins are employed for holding an article within the puck, other means can be employed for holding an article within the puck. Similarly, the present invention is not limited to the conveying of cans.

The present invention is particularly advantageous in that the conveying of non-magnetic articles is no longer limited to standard belt conveyors. Furthermore, the present invention permits conveying of articles in all directions.

Numerous modifications and variations of the present invention are possible in light of the above teachings and, therefore, within the scope of the appended claims, the invention may be practised otherwise than as particularly described.

What is claimed:

1. A puck for magnetically conveying an article, comprising:
    a plastic cylindrical container, including an open interior for receiving an article, an open bottom and an open top for inserting an article into the container, a plurality of circumferentially spaced vertical deflectable resilient plastic fins integral with the interior wall of the container and extending angularly inwardly at an acute angle therefrom, said fins extending substantially over the length of the container and having free ends spaced from the interior wall of the container whereby the fins are deflected toward the container wall upon insertion of an article into the container for holding the article within the container; and
    a magnetic material in the form of a ring secured to the container bottom, whereby an article can be magnetically conveyed in said container in all directions.

2. The puck of claim 1 wherein the container and fins are formed of polypropylene.

* * * * *